US010018226B2

United States Patent
Ishihara et al.

(10) Patent No.: US 10,018,226 B2
(45) Date of Patent: Jul. 10, 2018

(54) LINEAR MOTION GUIDE UNIT

(71) Applicant: NIPPON THOMPSON CO., LTD., Tokyo (JP)

(72) Inventors: Toyohisa Ishihara, Tokyo (JP); Shunsuke Kikuchi, Gifu-ken (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 15/435,575

(22) Filed: Feb. 17, 2017

(65) Prior Publication Data

US 2017/0254362 A1 Sep. 7, 2017

(30) Foreign Application Priority Data

Mar. 3, 2016 (JP) .................................. 2016-40761

(51) Int. Cl.
*F16C 29/06* (2006.01)
*F16C 43/04* (2006.01)

(52) U.S. Cl.
CPC ........ *F16C 29/065* (2013.01); *F16C 29/0607* (2013.01); *F16C 29/0633* (2013.01); *F16C 43/04* (2013.01); *F16C 2240/34* (2013.01)

(58) Field of Classification Search
CPC F16C 29/0697; F16C 29/0645; F16C 29/065; F16C 29/084; F16C 29/086; F16C 29/088; F16C 33/768; F16C 33/6614; F16C 33/6681; F16C 43/04; F16C 33/805; F16C 2240/30; F16C 29/0633; F16C 29/0607

USPC .......... 384/13–15, 44–45, 50, 564–565, 568; 464/168

See application file for complete search history.

(56) References Cited

U.S. PATENT DOCUMENTS

| 4,441,765 A | * | 4/1984 | Kasai | .................. F16C 29/0607 384/45 |
| 5,161,896 A | * | 11/1992 | Hofling | .................. F16C 29/001 384/44 |
| 5,391,003 A | * | 2/1995 | Ooya | .................... F16C 29/001 384/44 |

(Continued)

FOREIGN PATENT DOCUMENTS

| DE | 102007043222 A1 | * | 3/2009 | ............ F16C 29/065 |
| EP | 0472167 A2 | * | 2/1992 | ............ F16C 29/001 |

(Continued)

*Primary Examiner* — Marcus Charles
(74) *Attorney, Agent, or Firm* — Browdy and Neimark, PLLC

(57) ABSTRACT

A linear motion guide unit includes a guide rail and a slider. A carriage of the slider has a central portion located above the guide rail, and wing portions which extend downward from widthwise opposite ends of the central portion. Shoulder portions of the carriage located in inner boundary regions between the central portion and the wing portions of the carriage have first inclined surface so that the shoulder portions have padding portions. Corner portions of the guide rail located between an upper surface and longitudinal sides of the guide rail have second inclined surfaces which face the first inclined surfaces of the carriage and extend in the longitudinal direction parallel to the first inclined surfaces. The first inclined surfaces have an inclination angle substantially the same as an inclination angle of the nose surfaces of threaded holes formed in the carriage for attachment of a counterpart member.

1 Claim, 6 Drawing Sheets

(56) References Cited

U.S. PATENT DOCUMENTS

| | | | | |
|---|---|---|---|---|
| 5,800,064 | A * | 9/1998 | Ohya | F16C 29/0611 384/44 |
| 6,086,254 | A * | 7/2000 | Lyon | F16C 29/005 384/12 |
| 6,217,217 | B1 * | 4/2001 | Teramachi | F16C 29/0602 384/44 |
| 6,626,572 | B2 * | 9/2003 | Teramachi | F16C 29/0602 384/44 |
| 9,062,716 | B2 * | 6/2015 | Dittmar | F16C 33/6625 |
| 2008/0279489 | A1 * | 11/2008 | Kondo | F16C 29/065 384/15 |
| 2015/0104122 | A1 * | 4/2015 | Horie | F16C 29/0609 384/43 |

FOREIGN PATENT DOCUMENTS

| | | | | |
|---|---|---|---|---|
| JP | 08054018 A | * | 2/1996 | ............ F16C 29/065 |
| JP | 2006138386 A | | 6/2006 | |
| JP | 2007046690 A | * | 2/2007 | ............ F16C 29/065 |
| JP | 2012002361 A | | 1/2012 | |
| JP | 2015064057 A | | 4/2015 | |
| WO | WO-9409287 A1 | * | 4/1994 | .............. F16C 29/00 |

\* cited by examiner

LINEAR MOTION GUIDE UNIT

FIELD OF THE INVENTION

The present invention relates to a linear motion guide unit including a slider which undergoes relative movement on an elongated guide rail via a plurality of rollers; i.e., rolling elements.

BACKGROUND OF THE INVENTION

In recent years, linear motion guide units have been built in sliding portions of various types of machines and apparatuses such as semiconductor manufacturing apparatus, machine tools, and assembling machines, and their use has been expanded. For such a linear motion guide unit, there has been demand to reduce its section height and prevent a decrease in the rigidity of the unit, which decrease would otherwise occur due to the reduced section height.

A conventional roller-type linear motion guide bearing device having an increased rigidity is disclosed in, for example, Japanese Patent Application Laid-Open No. 2006-138386. In the linear motion guide bearing device, rollers are used as rolling elements; a slider main body has padding (volume-increasing) portions provided at opposite inner corner portions thereof which face opposite corner portions of a guide rail located at widthwise opposite ends of the upper surface thereof; and the opposite corner portions of the guide rail have inclined surfaces which extend in the axial direction and which serve as volume decreasing portions which decrease the volumes of the opposite corner portions of the guide rail by an amount corresponding to the amount by which the volumes of the opposite inner corners of the slider main body are decreased by the padding (volume-increasing) portions.

A linear motion guide unit including a slider which straddles an elongated guide rail and which can slide in the longitudinal direction of the guide rail via rollers serving as rolling elements is disclosed in, for example, Japanese Patent Application Laid-Open No. 2015-64057. The slider of the linear motion guide unit includes a carriage which has a pair of raceway surfaces formed to face raceway surfaces of a guide rail and return passages extending parallel to the pair of raceway surfaces; end caps which are disposed on end surfaces of the carriage located on opposite sides thereof with respect to its sliding direction and have turnaround passages for establishing communications between upper and lower raceway passages and upper and lower return passages; and end seals disposed on end surfaces of the end caps located on the outer side thereof with respect to the sliding direction. Rollers and separators are built in such that, within the raceway passages, the end surfaces of the rollers are held by corresponding retainer plates attached to the carriage and the end caps and the rollers roll and travel, with their rolling surfaces (their cylindrical outer circumferential surfaces) being in contact with the raceway surfaces. The retainer plates are attached to the slider through use of holding bands whose opposite ends are fixed to the end caps.

Also, a guide device using roller retainers is disclosed in, for example, Japanese Patent Application Laid-Open No. 2012-2361. The disclosed guide device includes roller retainers each coupling a large number of rollers, and roller retainer holding members for holding the roller retainers. In the guide apparatus, opposite inner corner portions of the slider have inclined surfaces so as to increase the volumes of the corner portions.

In the above-described linear motion guide bearing device disclosed in Japanese Patent Application Laid-Open No. 2006-138386, when an external tensile or compressive load acts on the slider main body, the rigidity of the slider main body decreases, and the slider main body deforms such that the wing portions of the slider main body open (i.e., the distance between the wing portions of the slider main body increases), which is not preferred and is problematic. The publication discloses a measure for overcoming the above-mentioned problem. Specifically, in the linear motion guide bearing device, volume increasing portions realized by inclined surfaces are formed at the opposite inner corner portions of the slider so as to increase the volumes of the corner portions, and volume decreasing portions are formed at the corner portions of the guide rail which face the volume increasing portions. However, the linear motion guide bearing device has a problem that the overall height of the device itself is large because the inclined surfaces of the opposite inner corner portions of the slider have an inclination angle of 45°. In the guide device disclosed in Japanese Patent Application Laid-Open No. 2012-2361, which includes roller retainers and roller retainer holding members for holding the roller retainers, inclined surfaces are also formed at the opposite inner corner portions of the slider so as to increase the volumes of the corner portions. However, since the inclined surfaces of the opposite inner corner portions of the slider have an inclination angle of 45° as in the case of the linear motion guide bearing device described above, the guide device has a problem that the overall height of the device itself is large.

Incidentally, there has been demand for such a linear motion guide unit to reduce the section height of a carriage which forms a slider. In order to meet such a demand, the inventors of the present invention modified the conventional carriage such that a central portion of the carriage has a reduced thickness. In this case, however, there has occurred a phenomenon that the rigidity of shoulder portions of the carriage between the central portion and the wing portions thereof decreases, and when the carriage receives a load, the wing portions deform. Therefore, there is a technical challenge to configure a linear motion guide unit such that even when the thickness of the central portion of the carriage portion is reduced, the rigidity of the shoulder portions in the boundary regions between the central portion and the wing portions of the carriage does not decrease, and problems such as concentration of stress do not occur, whereby bending deformation of the wing portions in relation to the central portion is restrained.

SUMMARY OF THE INVENTION

An object of the present invention is to solve the above-described problem and provide an improved linear motion guide unit configured such that, in order to prevent a decrease in the rigidity of opposite shoulder portions (corner portions) of a carriage in boundary regions between a central portion and wing portions of the carriage, instead of arcuate surfaces conventionally formed on the carriage, slightly inclined surfaces are formed on opposite inner corner portions (inner corner portions of the shoulder portions) so as to increase the volumes of the inner corner portions; i.e., have padding portions. In the improved linear motion guide unit, a guide rail has inclined surfaces formed on corner portions thereof between its upper surface and longitudinal sides, the inclined surfaces corresponding to the inclined surfaces of the carriage whereby the overall height of the unit itself is decreased to the extent possible. Further, in the improved linear motion guide unit, the gap between the slider and the guide rail is decreased to the extent possible, and the guide surfaces of the carriage which support end surfaces of rollers (rolling elements) are formed to have large contact surfaces, whereby skew of the rollers is less likely to occur.

Means to Solve the Problems

A linear motion guide unit according to the present invention comprises a guide rail having opposite longitudinal sides extending in a longitudinal direction thereof and first raceway surfaces formed along the longitudinal sides; and a slider disposed on the guide rail via a plurality of rolling elements and being slidable in the longitudinal direction. The slider includes a carriage which has second raceway surfaces facing the first raceway surfaces and return passages extending, in the longitudinal direction, along raceway passages formed between the first raceway surfaces and the second raceway surfaces; end caps which are respectively attached to opposite end surfaces of the carriage and have turnaround passages for establishing communication between the raceway passages and the return passages; and rollers which serve as the rolling elements and roll and travel through corresponding circulating circuits formed by the raceway passages, the return passages, and the turnaround passages.

The carriage has a central portion located above the guide rail, and wing portions which extend downward from widthwise opposite ends of the central portion and extend along the longitudinal sides of the guide rail. Shoulder portions of the carriage which are located in inner boundary regions between the central portion and the wing portions of the carriage have first inclined surface so that the shoulder portions have padding portions for increasing the rigidity of the carriage and avoiding stress concentration. Corner portions of the guide rail which are located between an upper surface of the guide rail and the longitudinal sides located at widthwise opposite ends of the upper surface have second inclined surfaces which face the first inclined surfaces of the carriage and extend in the longitudinal direction parallel to the first inclined surfaces.

Preferably, the first inclined surfaces of the carriage has an inclination angle substantially the same as an inclination angle of a nose surface of a threaded hole which is formed in the carriage to be used for attachment of a counterpart member. Specifically, the inclination angle of the first inclined surfaces of the carriage is substantially set to 30°.

In the linear motion guide unit, preferably, each of the rollers has a rolling surface for rolling and traveling through the corresponding circulating circuit, and first and second end surfaces on the opposite sides of the rolling surface; a retainer plate for holding the rollers in the carriage is fixedly disposed in an engagement groove formed between a pair of the second raceway surfaces of the carriage; and the retainer plate guides the first end surfaces of the corresponding rollers, and guide surfaces extending perpendicularly from ends of the second raceway surfaces opposite the engagement groove and extending in the longitudinal direction guide the second end surfaces of the corresponding rollers, the guide surfaces extending over a distance equal to or greater than the radius of the rollers and forming contract surfaces between the guide surfaces and the second end surfaces of the rollers. Namely, the rollers come into contact with the guide surfaces through large contact surfaces. Therefore, occurrence of skew of the rollers can be prevented.

In the linear motion guide unit, preferably, a recess in which an inside seal is disposed is formed on a lower surface of the central portion of the carriage. The retainer plate is preferably fixed to the carriage through use of a retaining member or held by the end caps through a holding band.

Effects of the Invention

Since the linear motion guide unit is configured as described above, the overall height of the unit itself can be reduced to the extent possible by reducing the thickness of the central portion of the carriage. Along with this, the shoulder portions of the carriage located in the inner boundary regions between the central portion and the wing portions of the carriage have the first inclined surfaces so that the shoulder portions have padding portions (i.e., volume increasing portions). Thus, the rigidity of the shoulder portions of the carriage is increased, and deformation of the carriage due to a load acting thereon is suppressed. Also, the inclination angle of the first inclined surfaces is made substantially the same as the inclination angle of the nose surface of the threaded hole formed in the carriage, which hole is used for attachment of a counterpart member. Therefore, a local decrease in the strength of the carriage can be prevented, whereby the strength of the carriage is secured. Furthermore, the gaps between the shoulder portions and the guide rail are smaller than those in the case where the shoulder portions have semi-circular concave surfaces like the conventional linear motion guide unit. Thus, the section height of the unit itself can be reduced, and the unit itself can be configured to have a reduced size. In addition, it is possible to prevent the concentration of stress to the boundary regions (namely, the shoulder portions) between the central portion and the wing portions of the carriage at the time when load acts on the carriage, to thereby secure the strength of the carriage. Furthermore, the rollers, which serve as rolling elements, are guided by the guide surfaces of the carriage which support at least halves of the second end surfaces of the corresponding rollers. Therefore, skew of the rollers is less likely to occur, and the rollers roll and travel smoothly, whereby the slider can travel smoothly on the guide rail for relative movement in relation thereto.

DETAILED DESCRIPTION OF THE EMBODIMENTS

Figure 1:
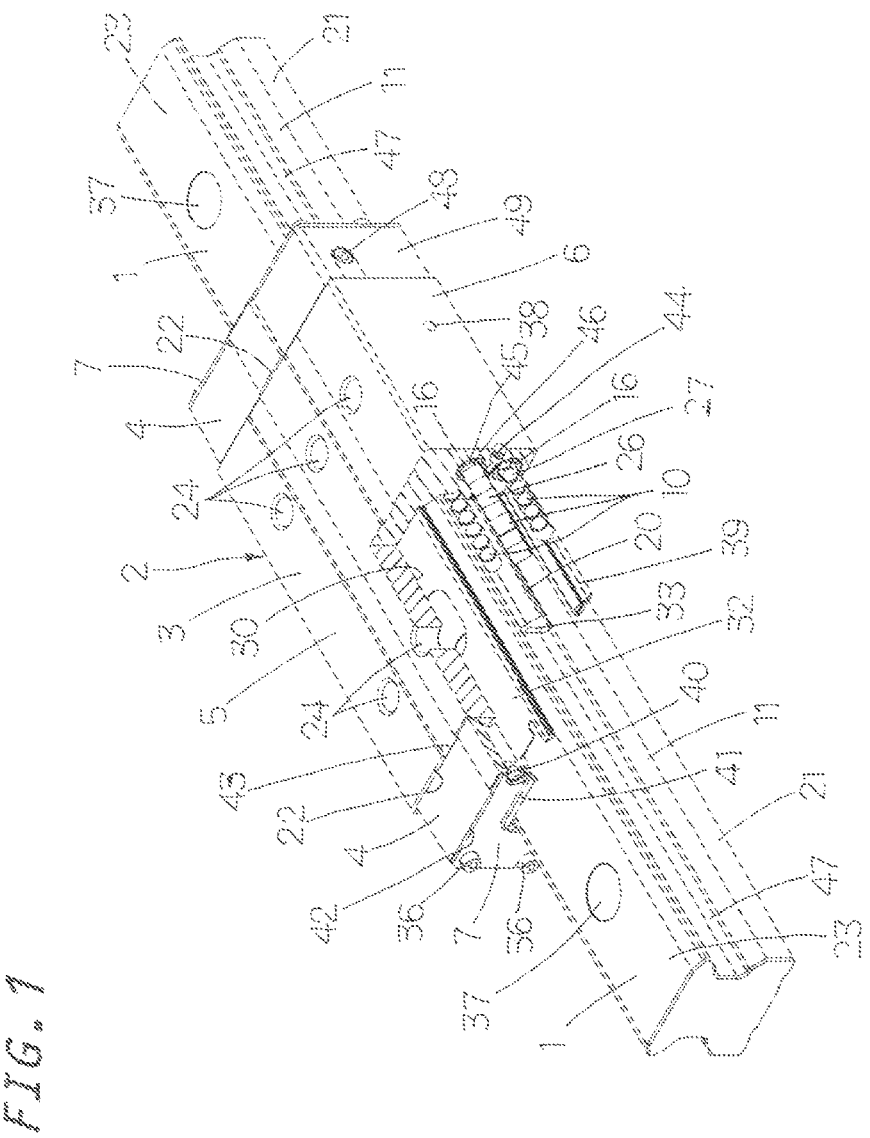
FIG. 1 is a partially cut away external perspective view showing an embodiment of the linear motion guide unit according to the present invention.
Figure 2:
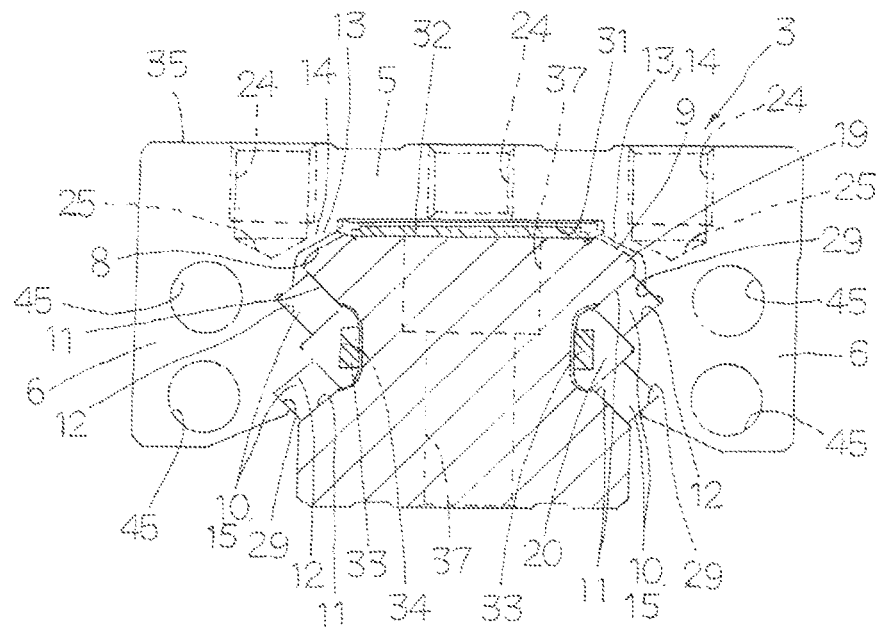
FIG. 2 is an end view of a carriage of the linear motion guide unit of FIG. 1.
Figure 3:
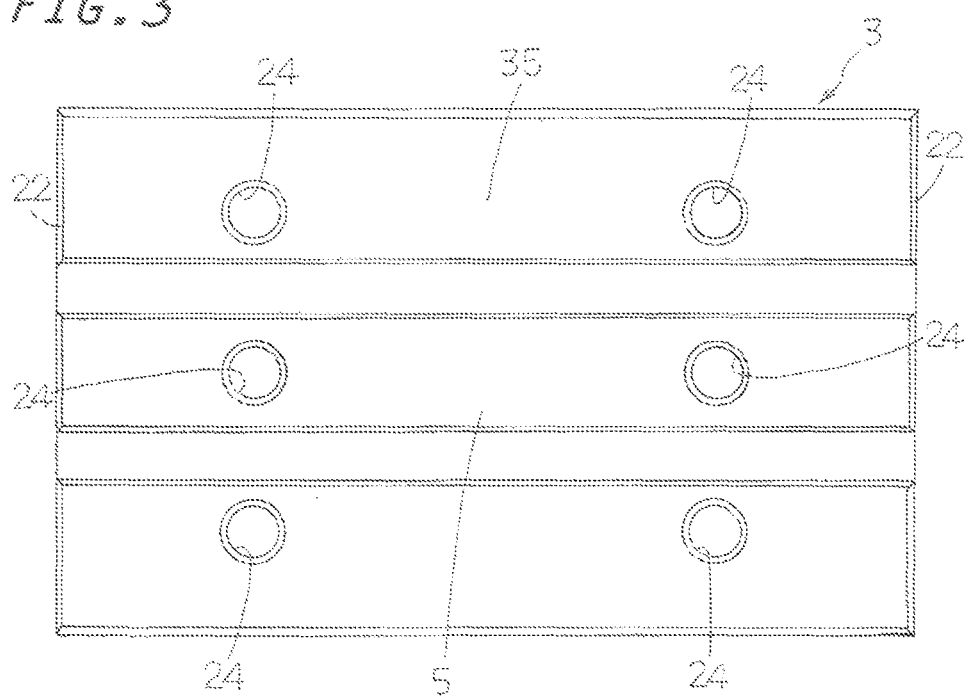
FIG. 3 is a plan view of the carriage of the linear motion guide unit of FIG. 1.

The linear motion guide unit according to the present invention is preferably built in sliding portions of various apparatuses such as semiconductor manufacturing apparatuses and precision machines. A first embodiment of the linear motion guide unit according to the present invention will now be described with reference to the drawings.

As shown in FIGS. 1 to 5, the linear motion guide unit according to the present invention includes a guide rail 1 and a slider 2. The guide rail 1 has raceway surfaces 11 (first raceway surfaces) formed on the wall surfaces of recessing grooves 47 extending along opposite longitudinal sides 21 of the guide rail 1. The slider 2 straddles the guide rail 1, has raceway surfaces 12 (second raceway surfaces) formed to face the raceway surfaces 11, and can slide relative to the guide rail 1 in the longitudinal direction via a plurality of rollers 10. The guide rail 1 has a plurality of holes 37 for attachment to a base or the like. The holes 37 are provided at predetermined intervals in the longitudinal direction and extend from an upper surface 23 toward a lower surface of the guide rail 1. The slider 2 includes a carriage 3, a pair of end caps 4, end seals 7, and rollers 10 which are rolling elements. The carriage 3 has raceway surfaces 12 and a pair of return passages 16 which extend along a pair of raceway passages (load-carrying races) 15 (see FIG. 2) formed between the raceway surfaces 11 and the raceway surfaces 12. The end caps 4 are attached to opposite end surfaces 22 of the carriage 3 and has arcuate turnaround passages (not shown) which establish communication between the raceway passages 15 and the return passages 16. The end seals 7 are attached to end surfaces 42 of the end caps 4 and have lip portions 41 formed on their surfaces which face the guide rail 1. The rollers 10 roll and travel through circulating circuits (not shown) composed of the raceway passages 15, the return passages 16, and the pair of turnaround passages. The slider 2 is constructed as follows. Fixing bolts 36 inserted into holes (not shown) formed in the end seals 7 and the end caps 4 are screwed into threaded holes (not shown) formed in the carriage 3 so as to integrally assemble the end caps 4 and the end seal 7 to the carriage 3, whereby the slider 2 is constructed. The lip portions 41 of the end seals 7 seal the gaps between the end caps 4 and the upper surface 23 of the guide rail 1.

In the first embodiment, the raceway surfaces 11 formed on the guide rail 1 and the raceway surfaces 12 formed on the slider 2 form two raceway passages 15, which are load-carrying races, on each of the left and right sides. The rollers 10, which roll and travel within the raceway passages 15 while receiving load are held by the slider 2 through the retainer plates 20. The retainer plates 20 are fixed as follows.

Fastening screws 44 (FIG. 1) are inserted into holes 38 formed in the carriage 3 and extending in the width direction thereof, and are screwed into threaded holes (not shown) formed in retaining members 33. A plurality (six in FIG. 3) of threaded holes 24 are formed on an upper surface 35 of the carriage 3. The threaded holes 24 are used to attach a counterpart member (not shown), such as various types of equipment, workpieces, attachment bodies, to the carriage 3. The return passages 16 of the carriage 3 are formed by inserting sleeves 46 into fore-and-aft bores 45 formed in the carriage 3 and extending in the longitudinal direction. The through-holes of the sleeves 46 serve as the return passages 16. The end caps 4 have respective connection protrusions (not shown) protruding from their end surfaces 43 on the carriage 3 side at positions where the turnaround passages are formed. The connection protrusions are fitted into the fore-and-aft bores 45 formed in the carriage 3. End surfaces of the sleeves 46 inserted into the fore-and-aft bores 45 formed in the carriage 3 butt against the connection protrusions, whereby the turnaround passages smoothly communicate with the corresponding return passages 16. In this linear motion guide unit, separators may be interposed between the rollers 10 so as to allow the rollers 10 to roll and travel smoothly. Notably, in FIG. 2, the rollers 10 and the sleeves 46 constituting the return passages 16 are omitted.

In the present linear motion guide unit, the slider 2 has lower seals 39 and an inside seal 32. The lower seals 39 are provided so as to seal the gaps between the longitudinal sides 21 of the guide rail 1 and lower surfaces of the slider 2. The inside seal 32 is disposed in a recess 31 formed on a lower surface 30 of the central portion 5 of the carriage 3. Opposite end portions of the inside seal 32 are inserted into and engaged with engagement recesses (not shown) formed in the end caps 4. Also, in the present linear motion guide unit, threaded holes 40 for attachment of grease nipples are provided in the end caps 4 or the end seals 7. Grease nipples for supplying lubrication oil to the slider 2 are attached to the threaded holes 40. For example, in the case of the present linear motion guide unit, when grease nipples are to be attached, they can be attached to the grease nipple attachment threaded holes 40 formed in the end seals 7. Alternatively, as shown in FIG. 1, the grease nipples may be attached to grease nipple attachment threaded holes 48 which are provided in oil supply holes formed in side walls 49 of the end caps 4. In the present linear motion guide unit, the above-mentioned recess 31 is formed on the lower surface 30 of the central portion 5 of the carriage 3. The inside seal 32 disposed in the recess 31 can seal the gap between the upper surface 23 of the guide rail 1 and the lower surface 30 of the central portion 5 of the carriage 3. Further, the above-described lower seals 39 for sealing the gaps between the longitudinal sides 21 of the guide rail 1 and the lower surfaces of the slider 2 are fixed to the carriage 3.

Figure 4:
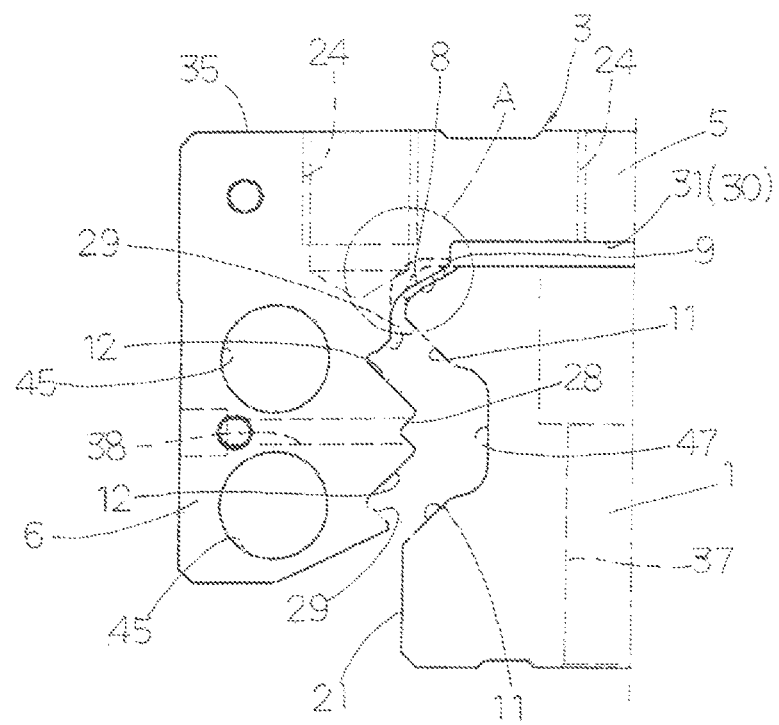
FIG. 4 is an end view of a left half of an embodiment of the carriage of the linear motion guide unit of FIG. 1, the carriage having a recess in which an inside seal is disposed.
Figure 5:
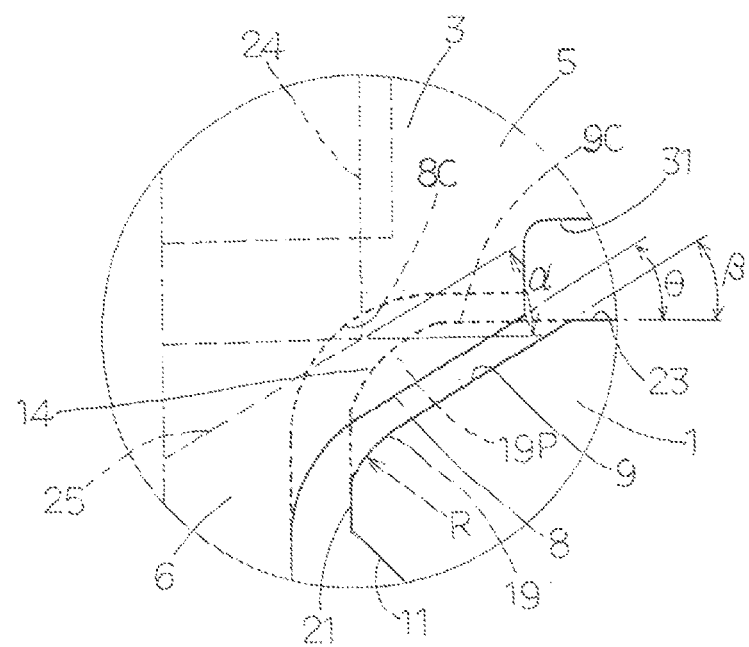
FIG. 5 is an enlarged sectional view of a region V of FIG. 4.
Figure 11:
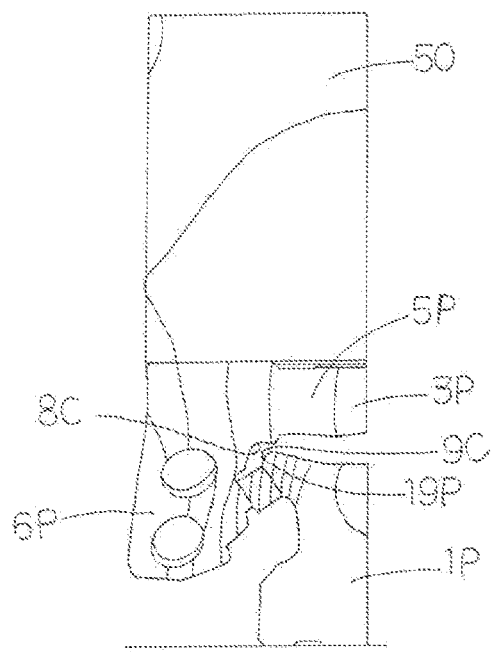
FIG. 11 is an explanatory view showing the results of the FEM analysis performed for the carriage of a conventional linear motion guide unit in a state in which the carriage was attached to the jig for FEM analysis of FIG. 8.

In the present linear motion guide unit, the carriage 3 is composed of the central portion 5 located above the guide rail 1, and the wing portions 6 which extend downward from widthwise opposite ends of the central portion 5 and extend along the longitudinal sides 21 of the guide rail 1. In particular, as shown in FIGS. 4 and 5, shoulder portions 13 of the carriage 3 in inner boundary regions between the central portion 5 and the wing portions 6 have inclined surfaces 8 (first inclined surfaces) so that the shoulder portions 13 have respective padding portions 14, and corner portions 19 of the guide rail 1 between the upper surface 23 and the longitudinal sides 21 on the widthwise opposite sides of the upper surface 23 have inclined surfaces 9 (second inclined surfaces) which face the inclined surfaces 8 of the padding portions 14 (the shoulder portions 13) of the carriage 3 and extend in the longitudinal direction parallel to the inclined surfaces 8. Dashed lines in FIGS. 4, 5, and 11 show the shapes of a conventional carriage 3P and a conventional guide rail 1P. Shoulder portions 13 of the carriage 3P each have a semi-circular concave surface 8C, and corner portions 19 of the guide rail 1P each have a semi-circular convex surface 9C. In other words, the padding portions 14 in the present invention each refer to a portion surrounded by one inclined surface 8 of the carriage 3 and a corresponding semi-circular concave surface 8C of the carriage 3P. The guide rail 1 has a cross-sectional shape obtained by removing, from the cross-sectional shape of the guide rail 1P, portions surrounded by the inclined surfaces 9 of the guide rail 1 and the semi-circular convex surfaces 9C depicted by dashed lines. The guide rail 1 has rounded surfaces R at the boundaries between the longitudinal sides 21 and the inclined surfaces 9. As shown in FIG. 5, the inclined surfaces 8 of the carriage 3 have an inclination angle $\theta$ which is substantially the same as the inclination angle $\alpha$ of nose surfaces 25 of threaded holes 24 formed in the carriage 3. The threaded holes 24 are used to attach a counterpart member (not shown) to the carriage 3. It is preferred that the inclined surfaces 9 of the guide rail 1 have an inclination angle $\beta$ which is substantially the same as the inclination angle $\theta$ of the inclined surfaces 8 of the carriage 3 from the viewpoint of relative sliding of the slider 2 on the guide rail 1. Specifically, the inclination angle $\theta$ of the inclined surfaces 8 of the carriage 3 is substantially set to 30°. Since the inclination angle $\theta$ is small, the overall height of the unit itself can be reduced to the extent possible.

In the present linear motion guide unit, each of the rollers 10 has a rolling surface 26 for rolling movement in the circulating circuit, and end surfaces 27 at opposite sides of the rolling surface 26. Retainer plates 20 for holding the rollers 10 in the carriage 3 are fitted into lengthwise grooves 28 formed between the paired raceway surfaces 12 of the carriage 3 and are fixed to the carriage 3. Each of the retainer plates 20 has a recess 34 formed on the guide rail 1 side and extending in the longitudinal direction. In the present linear motion guide unit, a retaining member 33 is disposed in the recess 34 of each retainer plate 20. The retainer plates 20 are fixed to the carriage 3 through use of fastening screws 44, which are inserted into holes 38 formed in the wing portions 6 of the carriage 3 and are screwed into threaded holes of the retaining members 33. In the first embodiment, the retainer plates 20 are fixed to the carriage 3 through use of the retaining members 33. However, the retainer plates 20 may be fixed to the carriage 3 through use of holding bands (not shown) which are disposed in the recesses 34 and whose opposite ends are held in band grooves (not shown) formed in the end caps 4.

In the present linear motion guide unit, the carriage 3 has guide surfaces 29 perpendicularly extending from the ends of the raceway surfaces 12 opposite the lengthwise grooves 28 and extending in the longitudinal direction. The retainer plates 20 guide the first end surfaces 27 of the rollers 10, and the guide surfaces 29 guide the second end surfaces 27 of the rollers 10 opposite the first end surfaces 27. The guide surfaces 29 extend over a distance equal to or greater than the radius of the rollers 10, so that the area of contact between each guide surface 29 and the second end surface 27 of each roller 10 is large.

Since the present linear motion guide unit is configured as described above, the overall height of the unit itself can be reduced to the extent possible by reducing the thickness of the central portion 5 of the carriage 3. Along with this, in order to make the strength and rigidity of the carriage 3 sufficiently high, the shoulder portions 13 of the carriage 3 located in the inner boundary regions between the central portion 5 and the wing portions 6 of the carriage 3 have the inclined surfaces 8 so that the shoulder portions 13 have padding portions (i.e., volume increasing portions). Thus, deformation of the carriage 3 due to a load acting thereon is suppressed. Further, the inclination angle $\theta$ of the inclined surfaces 8 of the carriage 3 is made substantially the same as the inclination angle $\alpha$ of the nose surfaces 25 of the threaded holes 24 formed in the carriage 3, which are used to attach a counterpart member, such as a workpiece or a piece of equipment, to the carriage 3. Therefore, a local decrease in the strength of the carriage 3 can be prevented, whereby the carriage 3 does not have locally weak portions and can have sufficiently high strength. Accordingly, the linear motion guide unit of the present invention is smaller in size than the conventional linear motion guide unit having semi-circular surfaces 8C and 9C. Thus, the section height of the unit itself can be reduced, and the unit itself can be configured to have a reduced size. In addition, it is possible to prevent the concentration of stress to the boundary regions (i.e., the shoulder portions 13) between the central portion 5 and the wing portions 6 of the carriage 3 at the time when load acts on the carriage 3, to thereby secure the strength of the carriage 3. Furthermore, the rollers 10, which serve as rolling elements, are guided by the guide surfaces 29 of the carriage 3 which support at least halves of the second end surfaces 27 of the corresponding rollers 10. Therefore, skew of the rollers 10 is less likely to occur, and the rollers 10 roll and travel smoothly, whereby the slider 2 can travel smoothly on the guide rail 1 for relative movement in relation thereto.

Figure 6:
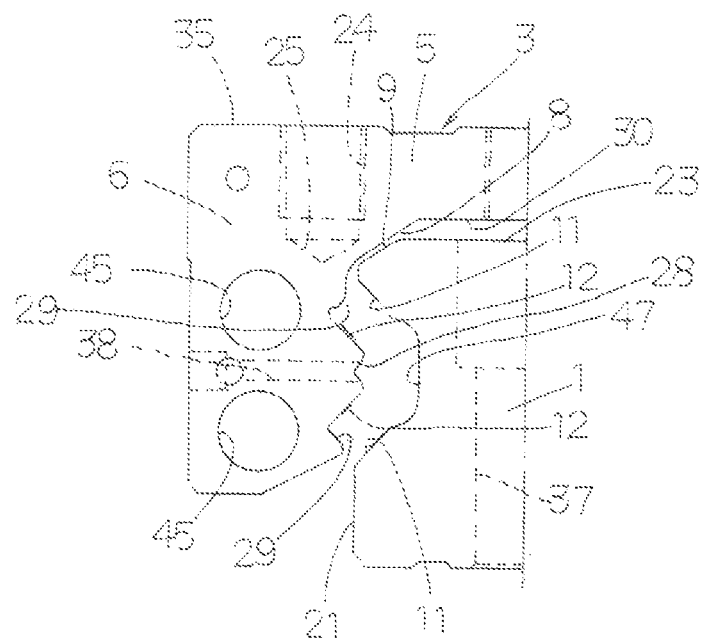
FIG. 6 is an end view of a left half of another embodiment of the carriage of the linear motion guide unit of FIG. 1, the carriage having no recess.
Figure 7:
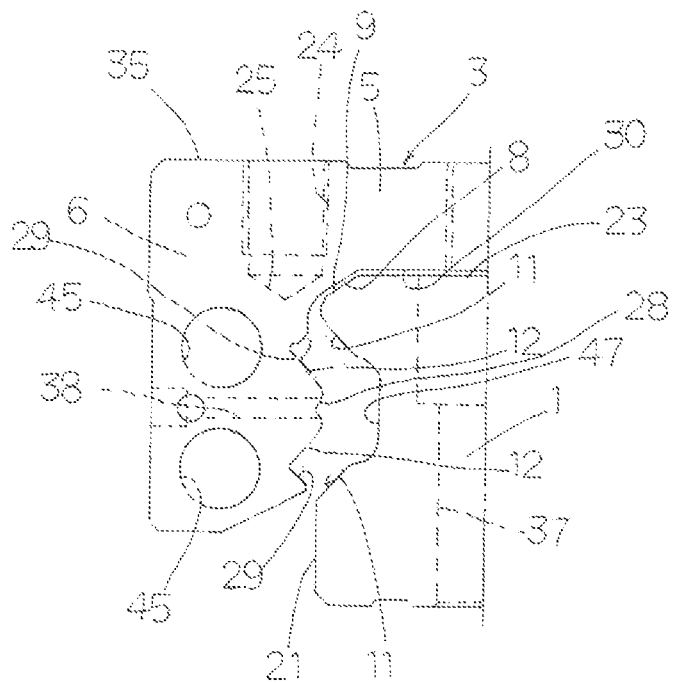
FIG. 7 is an end view of a left half of still another embodiment of the carriage of the linear motion guide unit of FIG. 1, the linear motion guide unit being of a roller type in which the gap between the carriage and a guide rail is decreased to the extent possible so as to reduce the overall height.

Next, a second embodiment of the linear motion guide unit according to the present invention will be described with reference to FIG. 6. In the second embodiment of the linear motion guide unit, no inside seal is provided on the lower surface 30 of the central portion 5 of the carriage 3. Namely, in the present invention, since the inside seal does not affect the rigidity of the carriage 3, a structure in which no inside seal is provided can be employed. Further, a third embodiment of the linear motion guide unit according to the present invention will be described with reference to FIG. 7. In the third embodiment of the linear motion guide unit, no inside seal is provided on the lower surface 30 of the central portion 5 of the carriage 3, and the gap between the lower surface 30 of the carriage 3 and the upper surface 23 of the guide rail 1 is decreased. Namely, a recess for disposing an inside seal in the carriage 3 is not required to be formed on the lower surface 30 of the central portion 5 of the carriage 3. Therefore, the thickness of the central portion 5 of the carriage 3 can be increased, whereby the rigidity of the carriage 3 can be increased.

Next, FEM (Finite Element Method) analysis performed on the carriage 3 built in the linear motion guide unit of the present invention will be described with reference to FIGS. 8, 9, 10, and 11.

Figure 8:
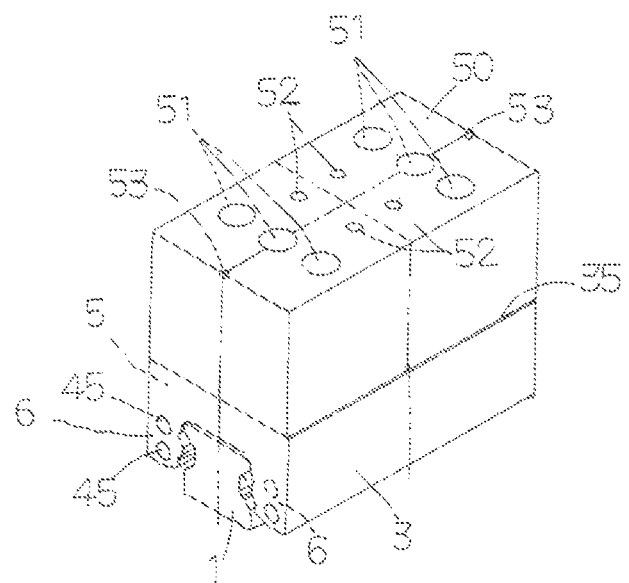
FIG. 8 is a perspective view of a jig used for FEM analysis of the carriage.
Figure 9:
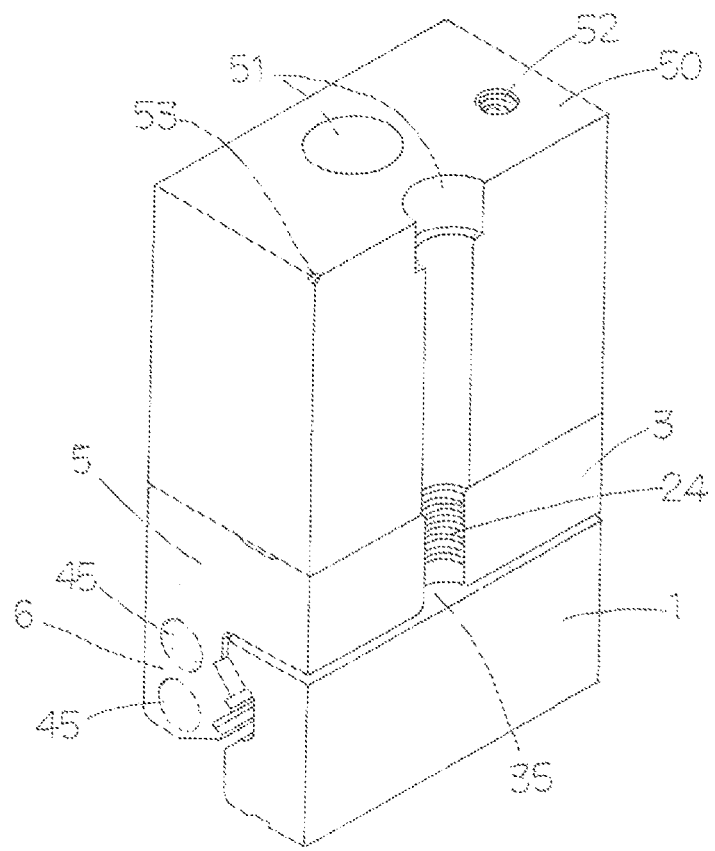
FIG. 9 is an explanatory view of one of four divided portions of the jig for FEM analysis of FIG. 8 and is used for describing its conditions.
Figure 10:
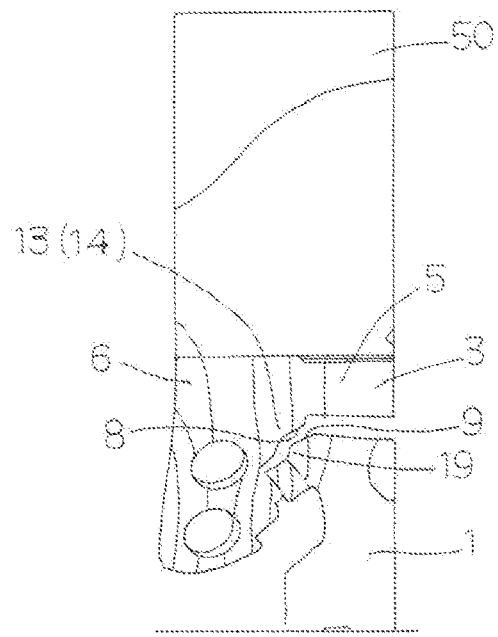
FIG. 10 is an explanatory view showing the results of the FEM analysis performed for the carriage of the linear motion guide unit of the present invention in a state in which the carriage was attached to the jig for FEM analysis of FIG. 8.

The FEM analysis for the carriages 3 and 3P were performed through use of a jig 50 shown in FIGS. 8 and 9. FIG. 10 shows the result of the FEM analysis performed on the carriage 3 built in the linear motion guide unit of the present invention in which the inner boundary regions between the central portion 5 and the wing portions 6 of the carriage 3 have the inclined surfaces 8, and the corner portions 19 of the guide rail 1 have the inclined surfaces 9. In contrast, FIG. 11 shows the result of the FEM analysis performed on the conventional carriage 3P (comparative example) in which the inner boundary regions between the central portion 5P and the wing portions 6P of the carriage 3P have the concave surfaces 8C each having an arcuate cross section; i.e., a semi-circular cross section, and the corner portions 19P of the guide rail 1P have the convex surfaces 9C each having an arcuate cross section; i.e., a semi-circular cross section. Since the central portion 5 of the carriage 3 has a small thickness, the central portion 5 of the carriage 3 may bend downward upon application of a load thereon, and the wing portions 6 may displace outward excessively (the distance between the wing portions 6 may increase excessively). Therefore, when the FEM analysis for the carriages 3 and 3P were performed, the thick jig 50 having a thickness of 100 mm was used so as to prevent the excessive outward displacement of the wing portions 6. Specifically, the jig 50 was fixed to the upper surface 35 of the carriage 3, and for the conventional carriage 3P, the jig 50 was fixed thereto in a similar manner. Through use of the jig 50 having a thickness of 100 mm, the downward warpage of the central portion 5 of the carriage 3 due to application of a load thereon was prevented. As a result of attachment of the jig 50 to the carriages 3 and 3P, it became possible to ignore the difference between the thickness of the central portion 5 of the carriage 3 and the thickness of the central portion of the conventional carriage 3P. In such a state, an FEM test was performed for the carriages 3 and 3P. First, the jig 50 was disposed on the upper surface 35 of the carriage 3 (3P), and fixation bolts (not shown) were inserted into through holes 51 formed in the jig 50 and were screwed into the threaded holes 24 formed in the carriage 3 (3P), whereby the jig 50 was fixed to the carriage 3 (3P).

The FEM analysis was performed under the following conditions. A screw (not shown) was screwed into a threaded hole 52 formed in the jig 50, and the screw was pulled upward so as to apply a load onto the carriage 3 (3P). In this state, displacement was measured at each of displacement observed points 53 at the centers of opposite ends of the upper surface of the jig 50. The load applied to the carriage 3 (3P) was 14,525 N. This applied load corresponds to 10% of the basic static load rating of the comparative example (conventional product).

The linear motion guide unit of the present invention is dimensioned such that the unit has an overall height of 75 mm, the guide rail 1 has a height of 56 mm, and the central portion 5 of the carriage 3 has a thickness of 15.5 mm. The conventional linear motion guide unit (the comparative example) is dimensioned such that the unit has an overall height of 90 mm, the guide rail 1P has a height of 56 mm, and the central portion 5P of the carriage 3P has a thickness of 30.5 mm.

FIGS. 10 and 11 show the results of the FEM analysis performed for the carriages 3 and 3P. As is clear from FIGS. 10 and 11, the displacements of the carriage 3 and the guide rail 1 according to the present invention are smaller than the displacements of the carriage 3P and the guide rail 1P of the comparative example. In other words, the wing portions 6P of the carriage 3P of the conventional product (the comparative example) displaced in the width direction more greatly as compared with the wing portions 6 of the carriage 3 according to the present invention, and the corner portions 19P of the conventional guide rail 1P displaced upward more greatly as compared with the corner portions 19 of the guide rail 1 according to the present invention. Specifically, whereas the displacement of the carriage 3 of the linear motion guide unit of the present invention upon application of the load thereto was 11.4 μm, the displacement of the carriage 3P of the conventional product (the comparative example) upon application of the load thereto was 12.3 μm. In other words, when the displacement of the conventional product (the comparative example) is taken as 100%, the displacement of the linear motion guide unit of the present invention is 93%, which means that the displacement can be reduced by 7%. Namely, as can be understood from the results of the FEM analysis performed for the carriages 3 and 3P, in the carriage 3 of the present invention, as a result of formation of the inclined surfaces 8 on the shoulder portions 13 in the boundary regions, the shoulder portions 13 have the padding portions 14, which conceivably increases the rigidity of the carriage 3.

What is claimed is:

1. A linear motion guide unit comprising:
   a guide rail having opposite longitudinal sides extending in a longitudinal direction thereof and first raceway surfaces formed along the longitudinal sides; and
   a slider disposed on the guide rail via a plurality of rolling elements and being slidable in the longitudinal direction,
   wherein the slider includes a carriage which has second raceway surfaces facing the first raceway surfaces and return passages extending, in the longitudinal direction, along raceway passages formed between the first raceway surfaces and the second raceway surfaces, end caps which are respectively attached to opposite end surfaces of the carriage and have turnaround passages for establishing communication between the raceway passages and the return passages, and rollers which serve as the rolling elements and roll and travel through corresponding circulating circuits formed by the raceway passages, the return passages, and the turnaround passages,
   wherein the carriage has a central portion located above the guide rail, wing portions which extend downward from widthwise opposite ends of the central portion and extend along the longitudinal sides of the guide rail, and shoulder portions located in inner boundary regions between the central portion and the wing portions, the shoulder portions each having a first inclined surface of padding portion for increasing the rigidity of the carriage and avoiding stress concentration, the central portion having threaded holes defined therein to be used for attachment of a counterpart member to the carriage, the threaded holes having an inner bottom surface having an predetermined inclination angle, and
   wherein corner portions of the guide rail which are located between an upper surface of the guide rail and the longitudinal sides located at widthwise opposite ends of the upper surface have second inclined surfaces which face the first inclined surfaces of the carriage and extend in the longitudinal direction parallel to the first inclined surfaces,
   wherein the first inclined surfaces of the carriage have an inclination angle substantially the same as the inclination angle of the inner bottom surface of the threaded holes, and the inclination angle of the first inclined surfaces of the carriage is substantially set to 30°,
   wherein each of the rollers has a rolling surface for rolling and traveling through the corresponding circulating circuit, first and second end surfaces on the opposite sides of the rolling surface, and a retainer plate for holding the rollers in the carriage fixedly disposed in an engagement groove formed between a pair of the second raceway surfaces of the carriage; and
   wherein the retainer plate guides the first end surfaces of the corresponding rollers, and guide surfaces extending perpendicularly from ends of the second raceway surfaces opposite the engagement groove and extending in the longitudinal direction guide the second end surfaces of the corresponding rollers, the guide surfaces extending over a distance equal to or greater than the radius of the rollers and forming contract surfaces between the guide surfaces and the second end surfaces of the rollers, and wherein a recess in which an inside seal is disposed is formed on a lower surface of the central portion of the carriage.

\* \* \* \* \*